(12) United States Patent
Mialhe et al.

(10) Patent No.: US 8,628,041 B2
(45) Date of Patent: Jan. 14, 2014

(54) METHOD FOR REALIZATION OF AN AIRCRAFT STRUCTURE AND RESULTING STRUCTURE

(75) Inventors: Christophe Mialhe, Giroussens (FR); Helene Bonnet, L'isle Jourdain (FR); Louis Peltier, Blagnac (FR)

(73) Assignee: Airbus Operations SAS, Toulouse (FR)

( * ) Notice: Subject to any disclaimer, the term of this patent is extended or adjusted under 35 U.S.C. 154(b) by 162 days.

(21) Appl. No.: 13/176,016

(22) Filed: Jul. 5, 2011

(65) Prior Publication Data

US 2012/0006940 A1 Jan. 12, 2012

(30) Foreign Application Priority Data

Jul. 8, 2010 (FR) ...................................... 10 55564

(51) Int. Cl.
*B64C 1/00* (2006.01)
(52) U.S. Cl.
USPC ........................ 244/117 R; 244/119; 244/120
(58) Field of Classification Search
USPC ..................................... 244/119, 117 R, 120
See application file for complete search history.

(56) References Cited

U.S. PATENT DOCUMENTS

| 1,966,933 | A | 7/1934 | Ragsdale |
| 4,531,695 | A | 7/1985 | Swinfield |
| 7,025,305 | B2 * | 4/2006 | Folkesson et al. ........ 244/117 R |
| 8,096,503 | B2 * | 1/2012 | Verweyen ...................... 244/119 |
| 8,215,584 | B2 * | 7/2012 | Cazeneuve et al. ............. 244/131 |
| 8,297,555 | B2 * | 10/2012 | Liguore et al. ................. 244/119 |
| 8,302,909 | B2 * | 11/2012 | Cazeneuve et al. ........... 244/120 |
| 2009/0283638 | A1 * | 11/2009 | Arevalo Rodriguez et al. ............................. 244/119 |
| 2010/0025529 | A1 * | 2/2010 | Perry et al. ................ 244/117 R |
| 2010/0148003 | A1 | 6/2010 | Verweyen |

FOREIGN PATENT DOCUMENTS

| DE | 10 2006 002 248 A1 | 7/2007 |
| GB | 830 072 A | 3/1960 |
| WO | WO 2007082644 A1 * | 7/2007 |
| WO | 2009/037006 A1 | 3/2009 |

OTHER PUBLICATIONS

French Search Report, dated Feb. 18, 2011, from corresponding French application.

* cited by examiner

*Primary Examiner* — Tien Dinh
*Assistant Examiner* — Michael Wang
(74) *Attorney, Agent, or Firm* — Young & Thompson

(57) ABSTRACT

An aircraft structure includes a skin (28) that is reinforced in two directions: by a first family of stiffeners called stringers (30) that are arranged in the longitudinal direction of the aircraft, and by a second family of stiffeners called frames (32) that are arranged in planes that are perpendicular to the longitudinal direction and that ensure the taking up of orbital forces, characterized in that at least one frame (32) has a hollow cross-section that is delimited by a closed profile, produced for a given cross-section in a single piece, of which one portion is in contact with the skin.

18 Claims, 3 Drawing Sheets

Figure 5:
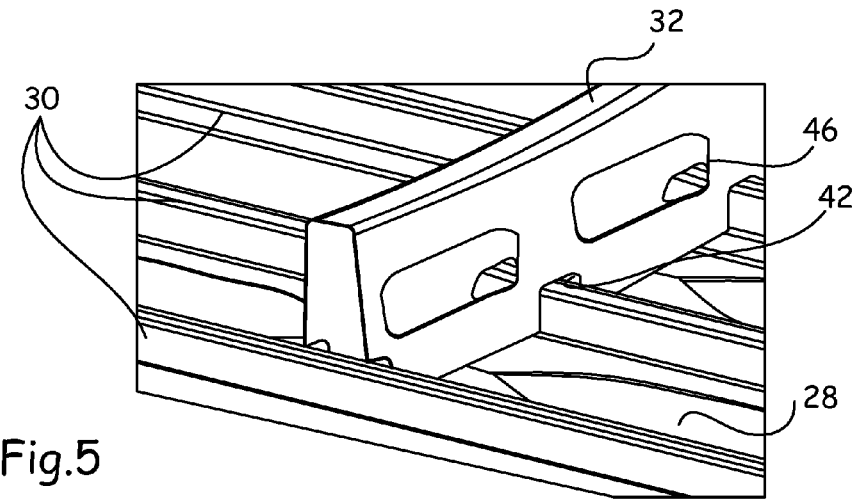

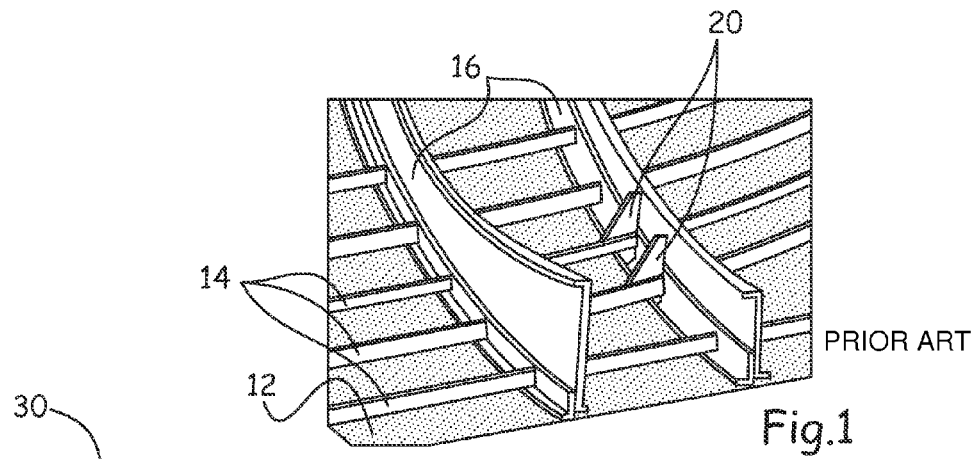
Fig.1 PRIOR ART
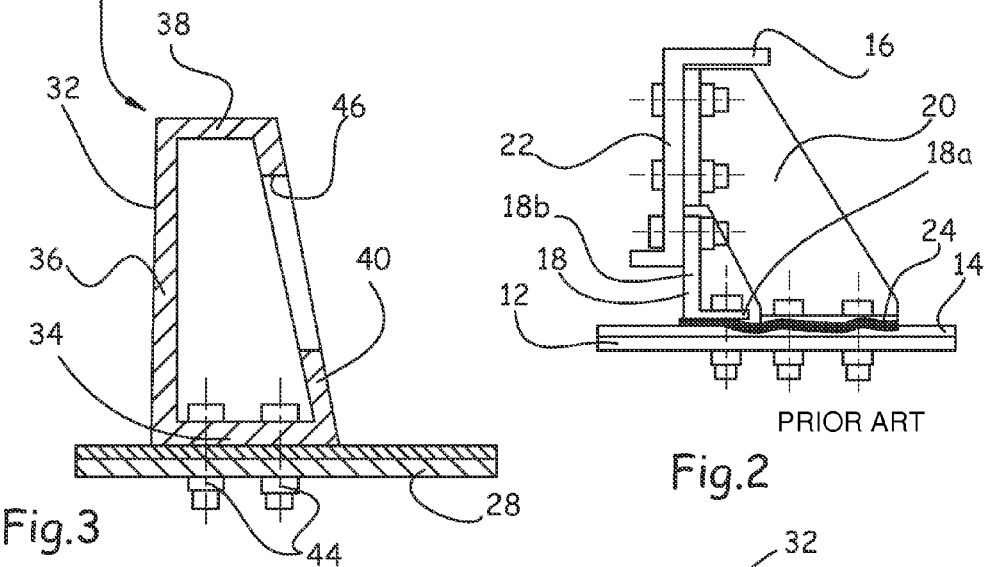
Fig.2 PRIOR ART
Fig.3
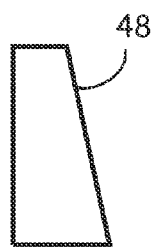
Fig.4A
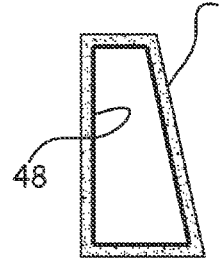
Fig.4B
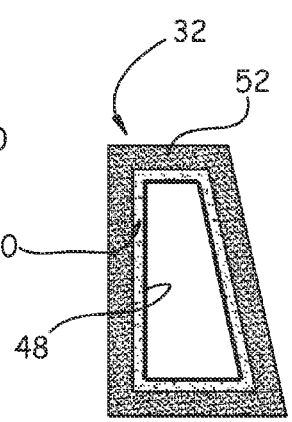
Fig.4C

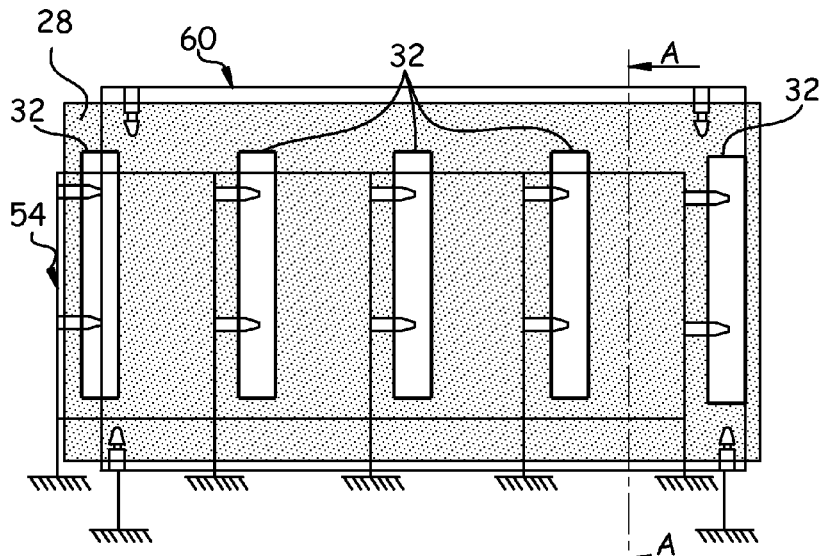
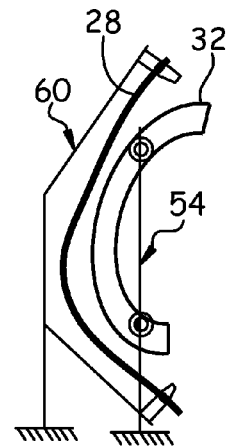
Fig.8A  Fig.8B
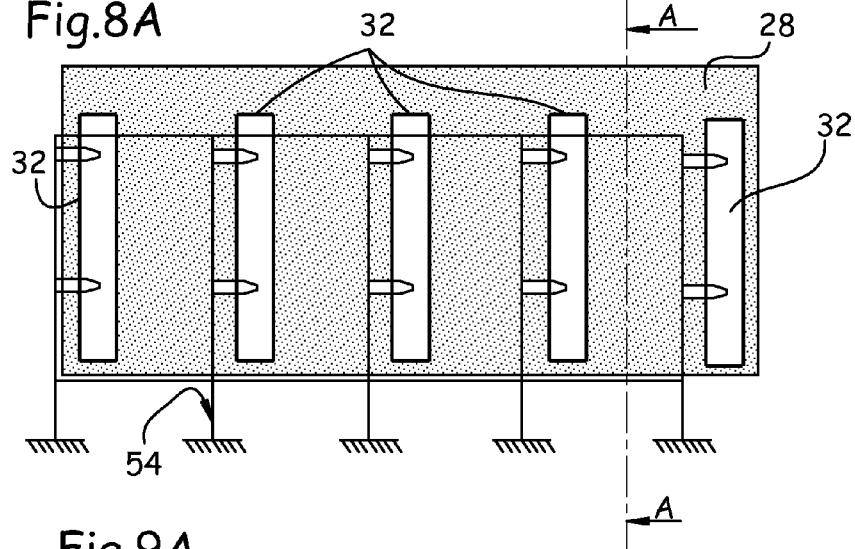
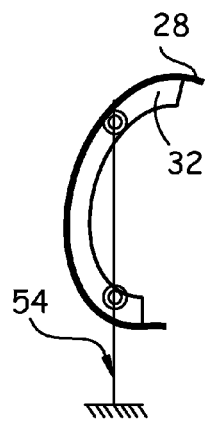
Fig.9A  Fig.9B
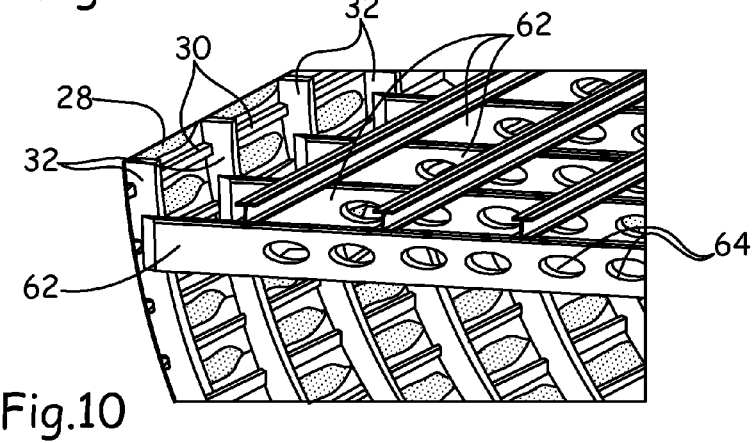
Fig.10

METHOD FOR REALIZATION OF AN AIRCRAFT STRUCTURE AND RESULTING STRUCTURE

This invention relates to a process for the production of an aircraft structure as well as a structure that is obtained from said process.

In a known manner, the fuselage of an aircraft comprises a structure that primarily ensures the function of taking up forces, to which structure is connected a shell, called aerodynamic shell below, imparting to the aircraft its aerodynamic properties. Thus, the structure comprises beams, frames, stringers, stiffeners, etc., assembled between one another. These elements can be metallic and/or made of composite material.

In a known manner, the aerodynamic shell comes in the form of a juxtaposition of panels or a complete section of metal sheets connected to the structure by riveting or any suitable means. As a variant, these panels can be made of composite material.

FIG. 1 shows a portion of an aircraft fuselage that comprises a skin 12, stringers 14 that are connected to the inside wall of the skin and arranged in the longitudinal direction of the aircraft, and frames 16 to which the stringers 14 and the skin 12 are connected, arranged in planes that are essentially perpendicular to the longitudinal direction.

Each frame ensures the function of orbital stiffener whereas the stringers ensure the function of longitudinal stiffener.

In a known manner, a frame 16 is connected to the skin 12 by means of clips or angle bars 18, as illustrated in FIG. 2. Each frame 16 is also connected to a stringer 14 by means of a stabilizer 20. In general, a frame has a profile that is J-shaped, I-shaped, Z-shaped, C-shaped or L-shaped with a central portion 22 that is arranged in a plane that is perpendicular to the skin or to the longitudinal direction. This type of cross-section makes it possible to obtain a significant thickness in the plane that contains the central portion. In addition, the stabilizers 20 increase the stiffness of the frame in a plane that is perpendicular to the central portion 22.

Each clip or angle bar 18 comprises a first wing 18a that is flattened against the inside wall of the stringer 14 and a second wing 18b that is connected to the frame 16. In parallel, a stabilizer 20 comprises a central part in the form of a plate that is perpendicular to the central part of the frame, with a first end that is connected to a stringer 14 and a second end that is connected to the frame 16.

One of the drawbacks of the assemblies described below is that, with the elements being assembled two by two, there are four connections of two elements. Since each connection imposes geometric and dimensional constraints on two surfaces, one for each connected element, the assembly imposes eight geometric and dimensional constraints in all that are added to the geometric and dimensional constraints provided at the outside surface of the skin and that of the frame that is not in contact with the stabilizer 20.

Another drawback is the fact that with each frame having an open profile that consists of flat sections that theoretically form 90° angles, an angular defect appears after machining or after baking between the flat sections that form between them an angle that diverges from the theoretical angle. This geometric defect requires blocks 24 at the connections to compensate for said defect and to ensure a correct positioning of the different elements of the assembly.

A process for assembly of these known elements consists in providing at least four equipment families. Thus, according to one procedure, the stringers 14 are made integral with the skin 12 on a first piece of equipment. Next, the skin 12 and the stringers 14 are shaped on a second piece of equipment. This second piece of equipment is to be rigid enough to ensure the taking up of forces during the shaping of the skin. After adding clips 18 to a third piece of equipment, the unit that consists of frames 16 and clips is made integral with the stringer 14 on a fourth piece of equipment by having adjusted the relative position of the unit (frames 16 and clips 18) and the stringer 14 thanks to blocks 24. Finally, it is possible to provide a fifth piece of equipment for the installation of stabilizers 20.

The increase in the number of parts to be assembled and in the amount of equipment, the increasing number of dimensional and geometric constraints, as well as the installation of blocks increase the time and the costs of production.

In the field of aircraft wings, the document US2010/0025529 proposes a process for assembling two stiffeners that can be connected at 90° thanks to a connecting element in the form of a hollow triangular section for replacing a T-shaped angle bar, whereby each stiffener to be connected is made integral with one outside surface of the hollow section that ensures the connection between the two stiffeners.

To ensure the connection between the skin and a frame, it would be possible to consider using a hollow triangular section that is analogous to the one that is described in the document US-2010/0025529 for replacing the clips or the angle bars 18. However, the use of this type of connecting elements would not reduce the number of elements to be assembled, or the number of geometric and dimensional constraints, and would not eliminate the addition of blocks to compensate for the geometric defects of the frame.

On the subject of aircraft structures, frames that ensure two functions, namely the structural function and the pipe function, are known according to the documents DE-10.2006.002248 and WO-2009/037006. According to the document WO-2009/037006, the frame comes in the form of a pipe that is connected to the skin by supports. Consequently, in addition to the frames, this type of assembly requires connecting elements between the frames and the skin. These elements complicate the assembly. According to another drawback, as above, the skin is shaped on a specific piece of equipment although its shapes are not completely adapted to those of the frames, and it is always necessary to insert blocks between the supports and the skin.

According to the document DE-10.2006.002248, the frame comes in the form of a U-shaped stiffener (open profile) in which a pipe is housed or that comprises a wall that delimits a pipe with a portion of the U-shaped profile. According to one embodiment, the U-shaped profile and the wall can be produced integrally, with the wall not being in contact with the skin to allow the installation of insulation. Thus, according to this document, the frame has a hollow cross-section with, at the periphery, two lugs that ensure the connection between the hollow cross-section and the skin. This solution makes it possible to simplify the assembly by eliminating the separate connecting elements of the frame.

However, as above, the skin is shaped on a specific piece of equipment with the result that its shapes are not perfectly adapted to those of the frames and that it is necessary always to insert blocks between the frames and the skin. Actually, the frames that are described in this document, and more particularly the lugs that ensure the connection between the hollow cross-section and the skin, are not rigid enough to make it possible to use the frames as equipment.

The purpose of this invention is to overcome the drawbacks of the prior art. For this purpose, the invention has as its first object a process for the production of an aircraft structure that makes it possible to reduce the number of elements to be assembled and consequently the on-board weight, to reduce the number of geometric and dimensional constraints and not requiring the use of blocks for adjusting between them the elements to be assembled.

A second object of the invention relates to an aircraft structure that comprises a skin that is reinforced in two directions: by a first family of stiffeners called stringers that are arranged in the longitudinal direction of the aircraft, and by a second family of stiffeners called frames that are arranged in planes that are perpendicular to the longitudinal direction and that ensure the taking up of orbital forces, characterized in that at least one frame has a hollow cross-section that is delimited by a closed profile, produced for a given cross-section in a single piece, of which one portion is in contact with the skin.

This geometry imparts great rigidity to the frame although it is possible to use the frame as a support surface during the shaping of the skin. With the latter being shaped directly on the frame, these shapes are adjusted to those of the frame although it is no longer necessary to provide blocks.

Figure 6:
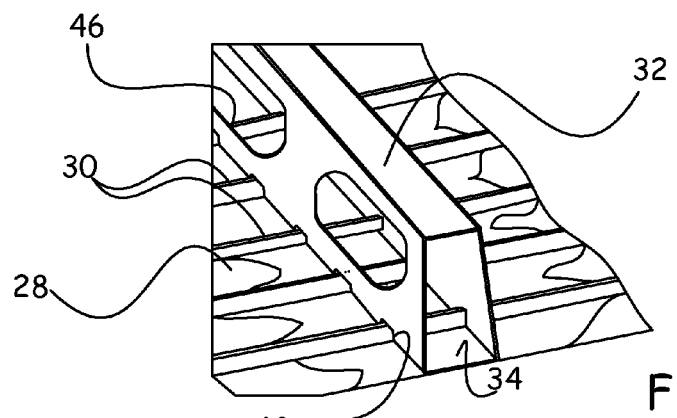
Figure 7A:
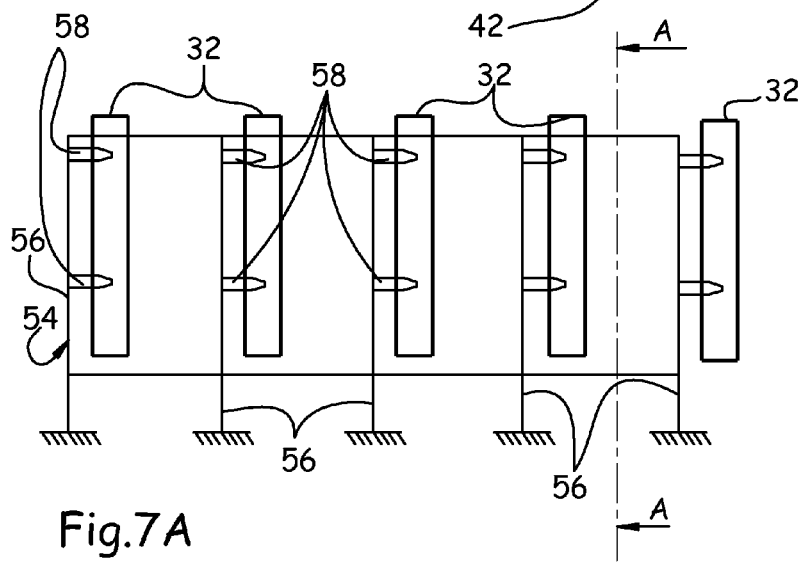
Figure 7B:
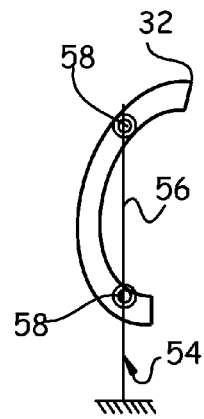

Other characteristics and advantages will emerge from the following description of the invention, a description that is provided only by way of example, relative to the accompanying drawings, in which:

FIG. 1 is a perspective view from the inside of a portion of a fuselage of an aircraft according to the prior art, FIG. 2 is a cutaway of a portion of the structure of the fuselage of an aircraft according to the prior art, FIG. 3 is a cutaway that illustrates a portion of the structure of the fuselage of an aircraft according to the invention, FIGS. 4A to 4C are cutaways that illustrate the different stages of production of a frame according to one variant of the invention, FIG. 5 is a perspective view from a first point that is located inside the fuselage on one portion of a structure that forms the fuselage of an aircraft according to the invention, FIG. 6 is a perspective view from a second point that is located inside the fuselage on one portion of a structure that forms the fuselage of an aircraft according to the invention, FIG. 7A is a lateral diagrammatic representation that illustrates a first stage of the process for production of a structure that forms the fuselage of an aircraft according to the invention, FIG. 7B is a diagrammatic representation of a cutaway along the line AA of FIG. 7A, FIG. 8A is a lateral diagrammatic representation that illustrates a second stage of the process for production of a structure that forms the fuselage of an aircraft according to the invention, FIG. 8B is a diagrammatic representation of a cutaway along the line AA of FIG. 8A, FIG. 9A is a lateral diagrammatic representation that illustrates a third stage of the process for production of a structure that forms the fuselage of an aircraft according to the invention, FIG. 9B is a diagrammatic representation of a cutaway along the line AA of FIG. 9A, and FIG. 10 is a perspective view of a structure according to the invention that forms a deck that is provided inside the fuselage of an aircraft.

FIGS. 3, 5 and 6 show a portion of the fuselage of an aircraft; the latter comprises a skin 28 that is reinforced in two directions by a first family of stiffeners called stringers 30 that are arranged in the longitudinal direction of the aircraft and by a second family of stiffeners called frames 32 that are arranged in planes that are perpendicular to the longitudinal direction and that ensure the taking up of orbital forces.

The stringers 30 are generally connected by any suitable means to the inside surface of the skin 28.

In a known manner, the skin 28 comes in the form of a juxtaposition of panels or a complete section of metal sheets connected to the structure by riveting or any suitable means. As a variant, these panels can be made of composite material.

The skin 28 and the stringers 30 are not described in more detail because they are known to one skilled in the art.

According to the invention, at least one frame 32 has a hollow cross-section that is delimited by a closed profile of which one portion is in contact with the skin.

The closed profile is produced for a given cross-section in a single piece and is not derived from the assembly of several parts.

According to one embodiment, the closed profile has a trapezoidal cross-section.

Thus, the frame 32 comprises a first flat section 34 in contact with the skin 28 or, as a variant, with the stringer 30 corresponding to the large base, a second so-called lateral flat section 36 that offers a support surface, a third flat section 38 that is essentially parallel to the first flat section 34 that corresponds to the small base, and a fourth so-called lateral flat section 40 that connects the first and third flat sections, inclined (not perpendicular) relative to the first flat section 34.

The closed profile makes it possible to obtain a box shape that increases the rigidity of the frame although it is no longer necessary to provide stabilizers.

According to another point, the flat section 38 that corresponds to the small base makes it possible to increase the moment of inertia in a plane that is perpendicular to the skin.

It will be appreciated that the closed profile with a hollow cross-section can have walls with different thicknesses so as to optimize the mechanical performance of the frame based on stresses that are imposed on it in operation. Thus, the flat sections 34, 40, 36 and 38 can have different thicknesses.

Along the cross-section of the frame, the angle between the large base of the trapezoid and the second flat section 36 is either obtuse or acute so as to fit the curvature of the skin 28 and to preserve the lateral flat section 36 that is perpendicular to the longitudinal axis of the aircraft.

The circular frame 32 can be made of a single part that extends over the entire circumference or can be obtained by the assembly of several sectors placed end to end.

According to another aspect, the frame 32 can have a constant or scalable cross-section based on the position of the cross-section on the circumference. Thus, the distance between the large base 34 and the small base 38 can vary like the separation between the two lateral flat sections 36, 40 and/or the inclination of the lateral flat section 40.

According to one embodiment, the frame 32 can be metal and can be made from a section that is obtained from a die and then bent.

According to one embodiment, the frame 32 can be made of a composite material, thanks to known processes such as, for example, by pultrusion, by weaving, or by orbital draping processes, . . . .

After the installation of fibers, the frame is partially polymerized in such a way as to obtain a partially or fully cooked element in such a way as to obtain a cooked element.

As illustrated in FIGS. 5 and 6, the frame 32 comprises cutaways 42 at the flat section 34 that corresponds to the large base that also extend at the lateral flat sections 36 and 40 so as to allow the stringers 30 to pass.

To lighten it and/or to allow it to be attached to the skin by connecting elements 44 (FIG. 3), such as, for example, rivets, the lateral flat section 40 that is inclined relative to the large base 34 comprises cutaways 46.

These cutaways 42 and 46 can be produced by machining. The fact of providing a frame 32 with a hollow profile makes it possible not to generate geometric defects (linked to the production of the hollow profile or to the machining of cutaways 42 and 46) and to eliminate the need for blocks for adjusting the elements to be assembled between them.

When the structure is metal, it forms a Faraday cage that protects the elements that are arranged inside said cage and ensures the functions of electric current return and metallization or putting the electrical systems at the same potential.

When the frame is made of composite material, according to one embodiment that is illustrated in FIGS. 4A to 4C, it can integrate the same functions as a metal frame on the electrical plane, and it can comprise at least one layer made of conductive material.

Thus, in a first phase that is illustrated in FIG. 4A, a shell 48 is made of a conductive material (netting, continuous sheet, expanded metal, . . . ) to which is connected a layer 50, for example a glass fiber layer, for preventing corrosion, as illustrated in FIG. 4B. Next, this layer 50 is covered by reinforcement fibers 52 that are used to constitute the frame 32, as illustrated in FIG. 4C.

As a variant, a metal mesh can be inserted between the folds of fibers of the frame.

According to another advantage that is obtained by a frame with a hollow profile, it is possible to use the frames 32 for ensuring the shaping of the panel that forms the skin.

According to a production mode, the frames 32 of a portion of the fuselage are arranged on a first piece of equipment 54, as illustrated in FIGS. 7A and 7B. According to one embodiment, the first piece of equipment 54 comprises a base that comprises struts 56, one for each frame 32, each with means 58 for positioning the frame. For this purpose, the struts 56 can comprise pins as positioning means 58 that penetrate the centering holes provided on each frame. This first piece of equipment 54 makes it possible to position the frames in the same manner as in the structure of the portion of the fuselage that is to be obtained.

The skin 28 that is optionally reinforced by the stringers 30 is made integral with a second piece of equipment 60 by any suitable means.

In this state, it is difficult to deform the skin 28 by bending in a first direction because of the presence of the stringers 30, but it can become deformed in another direction that is perpendicular to the first because it is not yet reinforced by the frames 32.

The two pieces of equipment 54 and 60 are positioned relative to one another as illustrated in FIGS. 8A and 8B.

Next, the skin 28 is deformed by flattening it against the frames 32 in such a way as to shape it to the radius of curvature of said frames 32, as illustrated in FIGS. 9A and 9B. Taking into account the rigidity of the frames 32 according to the invention, it is possible to use them as a piece of equipment for shaping the skin, contrary to the frames of the prior art.

Next, the frames 32 and the skin 28 are made integral by any suitable means, either by connecting elements such as rivets or by polymerization.

The particular profile of the frames 32 of the invention makes it possible to eliminate the clips and the stabilizers. Taking into account the number of parts to be assembled, the assembly times are reduced, and the number of dimensional and geometric constraints is limited to the surfaces 34 and 36 of the frames 32 and to the inside surface of the skin 28.

As a variant, the frames 32 consist of a continuous orbital section over the entire circumference of said structure (without splicing). On these frames, juxtaposed panels are flattened or a panel that has the shape of a slit tube is slipped onto the skeleton that is formed by continuous orbital frames.

The frame with a closed profile and the assembly process according to the invention can be applied to fuselage parts that correspond to the sections of an aircraft with essentially circular cross-sections but also to other parts of the fuselage such as at the front point or at the rear cone. This technique can also be used for forming the decks of an aircraft, as illustrated in FIG. 10. In this case, the crosspieces 62 of a deck can have a closed and hollow profile like the frames 32.

This technique makes it possible to improve the torsion behavior of said crosspieces 62.

Advantageously, the crosspieces 62 are diverted at each end in such a way as to obtain a beveled shape to make possible their attachments to frames 32.

Preferably, the crosspieces 62 are perforated thanks to cutaways 64 so as to lighten them or to access the inside of the crosspiece 62.

The frames 32 and the crosspieces 62 can be combined with frames and crosspieces according to the prior art.

According to another advantage, the hollow cross-section of the crosspieces 62 and frames 32 can be used as a path for cables and pipes.

The invention claimed is:

1. An aircraft structure comprising:
a skin (28) reinforced in two directions,
a first family of stiffeners called stringers (30) arranged in a longitudinal direction of an aircraft and reinforcing the skin in the longitudinal direction, the stringers connected to an inside surface of the skin; and
a second family of stiffeners called frames (32) arranged in planes perpendicular to the longitudinal direction and reinforcing the skin in the perpendicular to the longitudinal direction, the frames taking up of orbital forces, wherein,
at least one frame (32) has a hollow cross-section is delimited by a plurality of connected flat sections (34, 36, 38, 40) together defining a closed profile,
the at least one frame (32) is a single piece not derived from an assembly of plural parts,
a first of the flat sections (34) is in contact with the skin, and
a second of the flat sections (36) is connected to said first flat section (34), a third of the flat sections (38) is connected to said second flat section (36), a fourth of the flat sections (40) is connected to said third flat section (38), and said fourth flat section (40) is connected to said first flat section (34) thereby defining a closed, right trapezoidal profile.

2. The aircraft structure according to claim 1, wherein, said second flat section (36) is perpendicular to the longitudinal direction of the aircraft.

3. The aircraft structure according to claim 2, wherein, said second and fourth flat sections (36, 40) each comprises plural cutaways (42) having a lower portion at a level adjacent to said first flat section (42), and
said stringers pass through said cutaways (42).

4. The aircraft structure according to claim 2, wherein said second flat section (36) being connected to said first flat section (34), said third flat section (38) being connected to said second flat section (36), said fourth flat sections (40) being connected to said third flat section (38), and said fourth flat section (40) being connected to said first flat section (34) defines said closed profile as a hollow, trapezoidal cross-section, a large base of said trapezoid, defined by said first flat section (34), is flattened against the inside surface of the skin (28).

5. The aircraft structure according to claim 2, wherein said trapezoidal cross-section includes a pair of parallel right angles, a first of the right angles being between the first and second flat sections (34, 36) and a second of the right angles being between the second and third flat sections (36, 38).

6. The aircraft structure according to claim 2, wherein,
said second flat section (36) and said fourth flat section (40) comprise interior cutaways (46), and
said interior cutaways (46) are located within an interior part of each of said second and fourth flat sections (36, 40) located remote from upper and lower edges of each of said second and fourth flat sections (36, 40).

7. The aircraft structure according to claim 1, wherein,
said second and fourth flat sections (36, 40) each comprises plural cutaways (42) having a lower portion at a level adjacent to said first flat section (42), and
said stringers pass through said cutaways (42).

8. The aircraft structure according to claim 7, wherein said second flat section (36) being connected to said first flat section (34), said third flat section (38) being connected to said second flat section (36), said fourth flat sections (40) being connected to said third flat section (38), and said fourth flat section (40) being connected to said first flat section (34) defines said closed profile as a hollow, trapezoidal cross-section, a large base of said trapezoid, defined by said first flat section (34), is flattened against the inside surface of the skin (28).

9. The aircraft structure according to claim 7, wherein said trapezoidal cross-section includes a pair of parallel right angles, a first of the right angles being between the first and second flat sections (34, 36) and a second of the right angles being between the second and third flat sections (36, 38).

10. The aircraft structure according to claim 7, wherein,
said second flat section (36) and said fourth flat section (40) comprise interior cutaways (46), and
said interior cutaways (46) are located within an interior part of each of said second and fourth flat sections (36, 40) located remote from upper and lower edges of each of said second and fourth flat sections (36, 40).

11. The aircraft structure according to claim 1, wherein said second flat section (36) being connected to said first flat section (34), said third flat section (38) being connected to said second flat section (36), said fourth flat sections (40) being connected to said third flat section (38), and said fourth flat section (40) being connected to said first flat section (34) defines said closed profile as a hollow, trapezoidal cross-section, a large base of said trapezoid, defined by said first flat section (34), is flattened against the inside surface of the skin (28).

12. The aircraft structure according to claim 11, wherein said trapezoidal cross-section includes a pair of parallel right angles, a first of the right angles being between the first and second flat sections (34, 36) and a second of the right angles being between the second and third flat sections (36, 38).

13. The aircraft structure according to claim 11, wherein,
said second flat section (36) and said fourth flat section (40) comprise interior cutaways (46), and
said interior cutaways (46) are located within an interior part of each of said second and fourth flat sections (36, 40) located remote from upper and lower edges of each of said second and fourth flat sections (36, 40).

14. The aircraft structure according to claim 1, wherein,
said second flat section (36) and said fourth flat section (40) comprise interior cutaways (46), and
said interior cutaways (46) are located within an interior part of each of said second and fourth flat sections (36, 40) located remote from upper and lower edges of each of said second and fourth flat sections (36, 40).

15. The aircraft structure according to claim 1, wherein said at least one frame (32) is a composite material and comprises at least one layer of conductive material.

16. The aircraft structure according to claim 1, wherein said at least one frame (32) is continuous over an entire circumference of said structure.

17. The aircraft structure according to claim 1, wherein said first, second, third, and fourth flat sections have different thicknesses.

18. The aircraft structure according to claim 1, further comprising crosspieces (56), each crosspieces (56) being a closed and hollow section that supports a deck.

* * * * *